Figure 1:
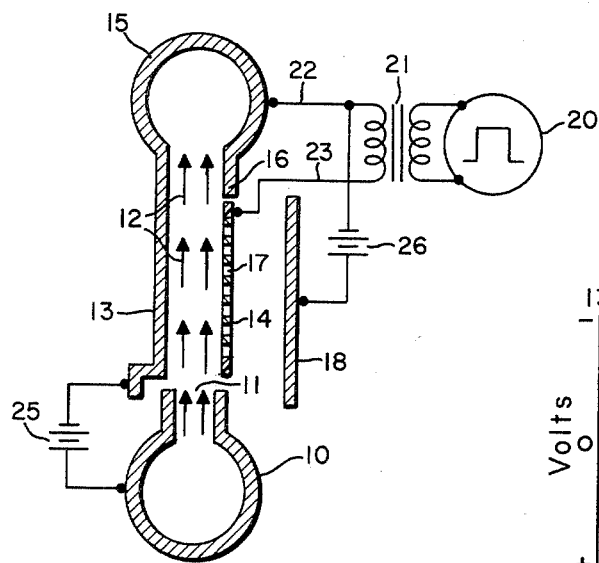

Dec. 15, 1959     O. G. SCHWEDE     2,917,628
ISOTOPE SEPARATOR
Filed March 16, 1955

INVENTOR.
OTTO G. SCHWEDE
BY
George J. Rubens
ATTORNEYS

2,917,628

ISOTOPE SEPARATOR

Otto G. Schwede, Ventura, Calif.

Application March 16, 1955, Serial No. 494,828

10 Claims. (Cl. 250—41.9)

(Granted under Title 35, U.S. Code (1952), sec. 266)

The invention described herein may be manufactured and used by or for the Government of the United States of America for governmental purposes without the payment of any royalties thereon or therefor.

The present invention relates to a new and novel isotope separator and more particularly to an isotope separator employing an arrangement of perforated and solid electrodes so arranged that a pulse voltage is applied between certain of the electrodes to deflect all the ions of an ion beam, and a counter electric field is produced between certain other of the electrodes to repel certain of the deflected ions to thereby cause a selective depositing of ions on various electrodes of the device.

Since the advent of atomic energy, the separation of isotopes has become a major problem particularly where it is desired to separate isotopes of small mass differences such as uranium 235 and uranium 238. Electrical methods of separating isotopes which in principal do not require a magnetic field are known and are based on the fact that ions of different masses having passed through the same electrical field possess different velocities even though the kinetic energy of the different isotopes is the same. By means of high frequency modulation and utilizing drift chambers, the isotopes can be unmixed and eventually individually separated. Such prior art methods have proven unsatisfactory because of the complex structure involved and the necessity of providing excessively long drift chambers.

The present invention utilizes an arrangement wherein a pulse voltage is applied to two electrodes thereby creating an electrical field which deflects an ion beam therein. One of these electrodes is perforated thereby permitting the deflected ions to pass therethrough. A collector electrode is positioned in the path of the deflected ions which have passed through the perforated electrode, and a counter electric field is produced between the perforated electrode and the collector electrode. This counter field repels a portion of the deflected ions and thereby causes only ions of a predetermined mass to be deposited on the collector electrode. With such an arrangement, the structure is greatly simplified and the necessity of providing a long drift chamber is eliminated thereby enabling the structure of the invention device to be very compactly constructed.

An object of the present invention is the provision of a new and novel isotope separator which is adapted to separate isotopes of small mass difference.

Another object of the present invention is to provide a new and novel isotope separator which eliminates the necessity of providing long drift chambers.

A further object of the invention is the provision of an isotope separator which is simple and compact in construction, yet efficient and reliable in operation.

Figure 2:
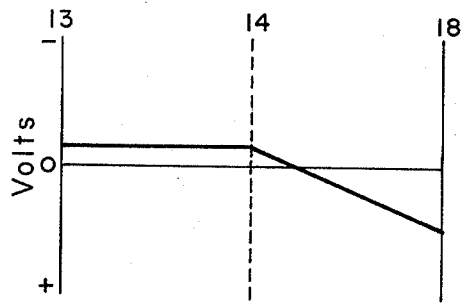
Figure 4:
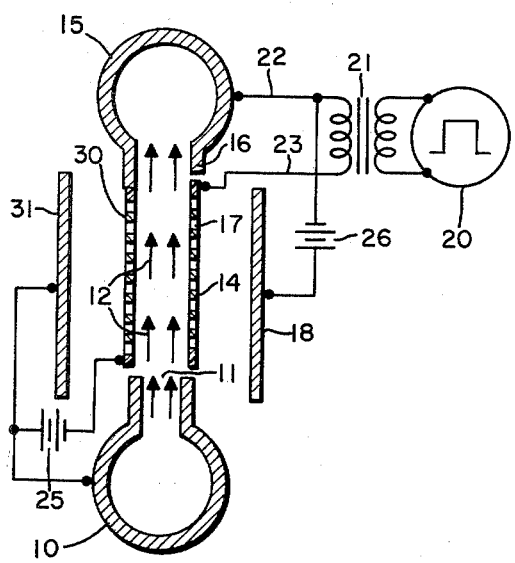
Figure 3:
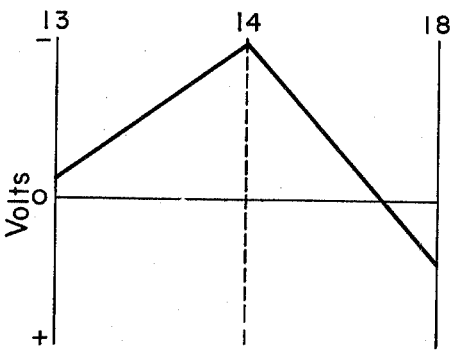

Other objects and many of the attendant advantages of this invention will be readily appreciated as the same becomes better understood by reference to the following detailed description when considered in connection with the accompanying drawings wherein:

Fig. 1 is a schematic cross-sectional view of a preferred embodiment of an isotope separator according to the present invention, Fig. 2 is a graph illustrating the potential distribution between the electrodes of the device shown in Fig. 1 when no impulse voltage is applied to the electrodes, Fig. 3 is another graph illustrating the potential distribution between the electrodes of the device when an impulse voltage is applied to certain of the electrodes, and Fig. 4 is a schematic cross-sectional view of a modification according to the present invention.

Referring now to the drawing wherein like reference characters designate like or corresponding parts through the several views, there is shown in Fig. 1 an ion source 10 of conventional construction which has been illustrated as including an enlarged lower portion with a narrow slit 11 formed in the upper portion thereof, the width of the slit being illustrated in Fig. 1. A relatively low velocity beam of positive ions travels in an upward direction from source 10 as indicated by the arrows 12 in Fig. 1. The ion beam passes between a first electrode 13 and a second electrode 14 which define a spatial path therebetween, electrodes 13 and 14 lying in planes substantially parallel to one another and having suitable means for closing the adjacent ends thereof such that an enclosed chamber is formed therebetween.

An ion collector 15 is secured to the upper end of electrode 13 and may be of conventional construction, the collector being shown as having an enlarged portion whereby the discharged ions may build up around the inner surface of the collector. It should be noted that the lower end 16 of the collector is spaced from or otherwise suitably physically insulated from electrode 14.

Electrode 14 is provided with a plurality of openings 17 formed therethrough such that substantially the entire surface of electrode 14 is perforated thereby allowing ions to pass freely through the openings therein. A collector electrode 18 is spaced from electrode 14 and lies in a plane substantially parallel thereto, suitable means being provided for enclosing the adjacent ends of electrodes 14 and 18 to thereby form an enclosed chamber therebetween. Electrode 18 is a solid electrode as is electrode 13 in contrast to perforated electrode 14.

A pulse generator 20 is connected to the input of a transformer 21, one lead 22 of the output of the transformer being connected to collector 15 and thereby to electrode 13, and the other lead 23 of the output of the transformer being connected to electrode 14. Generator 20 may be of any conventional design, producing electrical impulses the duration and amplitude of which are adjusted in a manner hereinafter described. The polarity of the pulse applied to transformer 21 is such that electrode 14 becomes negative relative to electrode 13.

A battery 25 is connected by suitable leads between source 10 and electrode 13, the polarity of the battery being such as to normally bias electrode 13 to a negative potential with reference to source 10. The negative potential applied to electrode 13 is also applied to electrode 14 through the secondary coil of transformer 21. A second battery 26 is connected by means of suitable leads between electrode 18 and collector 15, the polarity of the battery being such as to impress a positive potential on electrode 18 with reference to collector 15.

Batteries 25 and 26 normally create a potential distribution between electrodes 13, 14 and 18 as illustrated in Fig. 2 when no impulse voltage is supplied by generator 20, it being noted that electrodes 13 and 14 are normally at the same negative potential and electrode 18 is normally at a positive potential with reference to source 10. When a pulse voltage is applied from generator 20 through transformer 21 to electrodes 13 and 14 of the device, electrode 14 becomes negative with respect to electrode 13 as illustrated in the potential distribution shown in Fig. 3 which occurs with the impulse voltage at peak value.

The operation of the device as shown in Fig. 1 is as follows:

A low velocity beam of positive ions is normally emitted from source 10 and travels upwardly along the spatial path between electrodes 13 and 14. As the positive ions move upwardly, a pulse voltage is applied from generator 20 through transformer 21 to electrodes 13 and 14. As electrode 14 becomes negative relative to electrode 13, the positive ions of the beam receive a velocity component toward electrode 14. The duration and amplitude of the pulse applied to electrodes 13 and 14 is so regulated that the first deflected ions of the beam reach electrode 14 when the voltage difference between electrodes 13 and 14 again reaches zero as shown in Fig. 2. The positive ions of the beam thereby pass through the openings in electrode 14 and enter the counter electric field existing between electrodes 14 and 18. The counter electric field decelerates the positive ions and the strength of this counter field as determined by battery 26 is carefully adjusted such that the ions of small mass may reach electrode 18 thereupon being discharged and deposited thereon, whereas the heavier ions are forced to reverse their direction before reaching electrode 18, being repelled back through the openings in electrode 14 and discharged and deposited on electrode 13 which is always at a negative potential. These ions which are not deposited upon either electrode 13 or 18 are collected by collector 15.

The aforementioned cycle of operation occurs almost instantaneously and a new group of positive ions enters the spatial path between electrodes 13 and 14, the pulse generator being so adjusted that another pulse is applied to electrodes 13 and 14 when the succeeding positive ions have approached the upper portion of electrode 14. It is apparent that the spatial path between the electrodes 13 and 14 is periodically filled with positive ions which are deflected and deposited on electrodes 13 and 18 and then the path is subsequently filled with more positive ions from source 10 such that a continuous cycle of depositing is carried on during operation. When a suitable deposit has been collected on electrodes 13 and 18, such deposits may be removed by well known conventional procedures.

Fig. 4 illustrates a modification wherein electrode 13 of Fig. 1 has been replaced by a perforated electrode 30 which is similar to electrode 14, electrode 30 being electrically connected to collector 15. An additional collector electrode 31 similar to electrode 18 is provided adjacent electrode 30, suitable means being provided for connecting the ends of electrodes 30 and 31 to provide an enclosed chamber therebetween. Battery 25 in the device shown in Fig. 4 is connected to electrode 30, source 10 and electrode 31 by suitable leads such that a negative potential is normally impressed on electrode 30 and zero potential impressed on electrode 31 with reference to source 10. The remaining components of the device shown in Fig. 4 are identical with those shown in Fig. 1. Baterries 25 and 26 are of such strength that the magnitude of the counter field between electrodes 30 and 31 is less than that between electrodes 14 and 18.

The operation of the device shown in Fig. 4 is similar to that of the device shown in Fig. 1 with the exception that the positive ions which are forced to reverse their direction by electrode 18 pass through electrodes 14 and 30 and are now deposited on electrode 31 whereas they are deposited on electrode 13 of the device shown in Fig. 1. Since the counter field between electrodes 30 and 31 is of less magnitude than that of the counter field between electrodes 14 and 18, the returning ions of greater mass and less energy are enabled to reach electrode 31 and be deposited thereon. Any ions which are not deposited either on electrode 18 or electrode 31 are collected by collector 15. The lighter ions are deposited on electrode 18 as in the case in the device shown in Fig. 1, but the heavier ions are now deposited on electrode 31. In order to compensate for the fluctuation of the pulses produced by generator 20, the voltage of batteries 25 and 26 may be suitably controlled by the voltage of the generator.

The components of the device may be of any desired configuration and it should be understood that the drawings are a somewhat schematic representation of one possible configuration. While electrodes 14 and 30 have been described as perforated, it is obvious that these electrodes may be constructed of wire mesh or other suitable construction for allowing the ions to pass therethrough. Furthermore, while it is usually desirable to separate positive ions, a negative ion beam may be employed and the polarity of each of the electrical sources may be reversed if it is desired to separate negative ions.

It is apparent from the foregoing that there is provided a new and novel isotope separator which is adapted to separate isotopes of small mass difference and which eliminates the necessity of providing long drift chambers. The device is simple and compact in construction, yet efficient and reliable in operation.

Obviously many modifications and variations of the present invention are possible in the light of the above teachings. It is therefore to be understood that within the scope of the appended claims the invention may be practiced otherwise than as specifically described.

I claim:

1. An isotope separator which comprises a source of ions, first and second spaced electrodes defining a spatial path therebetween, means for impelling ions from said source along said path, said second electrode having openings formed therethrough, a third electrode disposed outside said path and adjacent said second electrode, means for periodically producing an electrical field by applying a pulse voltage between said first and second electrodes such that the lines of force of said field are effective in one direction only and are substantially perpendicular to the original direction of travel of said ions, such field-producing means being effective to deflect said ions from their original path in the direction of said second electrode, and means for producing a counter electric field between said second and third electrodes.

2. A device as defined in claim 1 including means for normally impressing a constant electrical potential between said first electrode and said source.

3. A device as defined in claim 1 including collector means for collecting all the ions emitted from said source except those deposited on one of said electrodes.

4. A device as defined in claim 1 wherein said first and second electrodes are physically insulated from one another, and including a connection from said first electrode to said second electrode through an impedance.

5. An isotope separator which comprises a source of ions producing a low velocity beam of ions, collector means for collecting a portion of the ions emitted from said source, a chamber positioned between said source and said collector means and including first and second spaced electrodes defining a spatial path therebetween, said second electrode being perforated, a third electrode disposed outside said path and adjacent said second electrode, means for impressing a direct current electrical pulse of short time duration on said first and second electrodes whereby the lines of force of the electrical field produced between said first and second electrodes are substantially perpendicular to the original direction of travel of said beam, such field-producing means being effective to deflect said ions from their original path in the direction of said second electrode, and means for producing a direct current counter electric field between said second and third electrodes.

6. A device as defined in claim 5 wherein said last-mentioned means produces a positive electrical potential on said third electrode with respect to said first and second electrodes, and said pulse means when actuated causes said second electrode to have a greater negative potential with respect to said third electrode than that of said first electrode.

7. A device as defined in claim 6 including means for producing a negative potential on said first and second electrodes at all times with respect to the potential of said ion source.

8. An isotope separator which comprises a source of ions, first and second spaced electrodes defining a spatial path therebetween, means for impelling ions from said source along said path, each of said first and second electrodes having openings formed therethrough, a third electrode disposed outside said path and adjacent said first electrode, a fourth electrode disposed outside said path and adjacent said second electrode, means for periodically producing an electrical field between said first and second electrodes such that the lines of force of said field are effective in one direction only substantially perpendicular to the original direction of travel of said ions, such field-producing means being effective to deflect said ions from their original path in the direction of said second electrode, means for producing a counter electric field between said first and third electrodes, and means for producing a counter electric field between said second and fourth electrodes.

9. A device as defined in claim 8 wherein the electric field between said first and third electrodes is of less magnitude than the electric field between said second and fourth electrodes.

10. A device as defined in claim 8 wherein said first and second electrodes are normally at a negative electrical potential with respect to said third and fourth electrodes.

References Cited in the file of this patent

UNITED STATES PATENTS 2,570,158    Schissel  ---------------- Oct. 2, 1951